United States Patent
Olaleye (10) Patent No.: US 9,434,237 B2
(45) Date of Patent: Sep. 6, 2016

(54) PERIODIC SYSTEM DIAGNOSTIC OF A TRANSPORT REFRIGERATION SYSTEM

(71) Applicant: THERMO KING CORPORATION, Minneapolis, MN (US)

(72) Inventor: Omosola Waidi Olaleye, Brooklyn Park, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 0 days.

(21) Appl. No.: 14/432,510

(22) PCT Filed: Oct. 1, 2013

(86) PCT No.: PCT/US2013/062879
§ 371 (c)(1),
(2) Date: Mar. 31, 2015

(87) PCT Pub. No.: WO2014/055525
PCT Pub. Date: Apr. 10, 2014

(65) Prior Publication Data
US 2015/0291005 A1     Oct. 15, 2015

Related U.S. Application Data

(60) Provisional application No. 61/708,194, filed on Oct. 1, 2012.

(51) Int. Cl.
*B60H 1/32* (2006.01)
*B60H 1/00* (2006.01)
(Continued)

(52) U.S. Cl.
CPC ............ *B60H 1/00792* (2013.01); *B60H 1/32* (2013.01); *B60H 1/3232* (2013.01); *B60P 3/20* (2013.01); *G01M 99/008* (2013.01); *F02N 11/08* (2013.01)

(58) Field of Classification Search
CPC .. B60H 1/32; B60H 1/3232; B60H 1/00428; B60H 1/00792; B60H 1/3211; B60H 1/00014; F02N 11/08; G01M 99/008; G05B 19/4189
USPC ......................................................... 702/183
See application file for complete search history.

(56) References Cited

U.S. PATENT DOCUMENTS 5,123,252 A    6/1992  Hanson
5,140,826 A    8/1992  Hanson et al.
(Continued)

FOREIGN PATENT DOCUMENTS

WO    2012/045056    4/2012

OTHER PUBLICATIONS

International Search Report and Written Opinion for International Application No. PCT/US2013/062879, dated Jan. 8, 2014, 9 pgs.
(Continued)

*Primary Examiner* — Gregory J Toatley
*Assistant Examiner* — Terence Stifter, Jr.
(74) *Attorney, Agent, or Firm* — Hamre, Schumann, Mueller & Larson P.C.

(57) ABSTRACT

Methods and systems for periodic system diagnostic of a TRS are provided. In particular, a TRS controller is configured to periodically activate an engine control unit (ECU) of a genset to acquire engine sensor information while the engine is not running. The TRS controller is configured to determine an efficient time to bring the ECU out of a minimum electrical power consumption stage into a medium power consumption stage in order to determine a next action of the TRS.

19 Claims, 4 Drawing Sheets

(51) Int. Cl.
  G01M 99/00 (2011.01)
  B60P 3/20 (2006.01)
  F02N 11/08 (2006.01)

(56) References Cited

U.S. PATENT DOCUMENTS

| | | | |
|---|---|---|---|
| 5,181,389 A | 1/1993 | Hanson et al. |
| 5,437,163 A | 8/1995 | Jurewicz et al. |
| 5,438,844 A | 8/1995 | Hoglund et al. |
| 5,456,088 A | 10/1995 | Hanson et al. |
| 5,564,285 A | 10/1996 | Jurewicz et al. |
| 5,579,648 A | 12/1996 | Hanson et al. |
| 5,628,199 A | 5/1997 | Hoglund et al. |
| 5,977,646 A | 11/1999 | Lenz et al. |
| 6,910,341 B2 | 6/2005 | Srichai et al. |
| 7,143,594 B2 | 12/2006 | Ludwig et al. |
| 7,654,098 B2 | 2/2010 | Pham et al. |
| 7,832,223 B2 | 11/2010 | Arshad et al. |
| 2007/0186573 A1 | 8/2007 | Ziehr et al. |
| 2007/0296379 A1* | 12/2007 | Gendron .......... H02P 9/08 322/37 |
| 2009/0228149 A1 | 9/2009 | Alston |
| 2010/0000241 A1 | 1/2010 | Kitano et al. |
| 2010/0269519 A1 | 10/2010 | Khosla et al. |
| 2010/0274604 A1 | 10/2010 | Crilly |
| 2012/0000212 A1 | 1/2012 | Sanders et al. |
| 2012/0017618 A1 | 1/2012 | Price et al. |
| 2012/0159971 A1* | 6/2012 | Fink .......... B60P 3/20 62/56 |
| 2012/0167605 A1* | 7/2012 | Ikemiya .......... B60H 1/32 62/126 |

OTHER PUBLICATIONS

Supplementary European Search Report issued in corresponding European Application No. 13844059.9 dated May 23, 2016 (7 pages).

* cited by examiner

PERIODIC SYSTEM DIAGNOSTIC OF A TRANSPORT REFRIGERATION SYSTEM

The embodiments disclosed herein relate generally to a transport refrigeration system (TRS). More particularly, the embodiments relate to methods and systems for periodic system diagnostic of a TRS.

BACKGROUND

Existing transport refrigeration systems are used to cool containers, trailers, and other similar transport units (typically referred to as a "refrigerated transport unit"). Modern refrigerated transport units may be efficiently stacked for shipment by ship, rail or truck. When cargo in the transport unit includes perishable products (e.g., food product, flowers, etc.), the temperature of the refrigerated transport unit can be controlled to limit loss of the cargo during shipment.

Some existing transport units include a generator set (genset) that supplies power to temperature-controlling components of the TRS. These gensets are typically attached directly to the transport unit or the transport unit chassis, and include an engine, a prime mover powered by the engine, and a fuel container to supply fuel to the engine.

SUMMARY

The embodiments described herein are directed to a TRS. In particular, the embodiments described herein are directed to methods and systems for periodic system diagnostic of a TRS.

The embodiments described herein provide methods and systems of a TRS controller for periodically activating an engine control unit (ECU) of a transport refrigeration unit (TRU) or genset to acquire engine sensor information. The TRS controller is configured to determine an efficient time to bring the ECU out of a minimum electrical power consumption stage into a medium power consumption stage in order to determine a next action of the TRS.

These embodiments can prevent the need to implement a duplicate set of engine data acquisition sensors on the TRS controller in order to shed current draw during, for example, TRU Cycle Sentry Null or other Start/Stop TRU modes. Thus, the TRS controller can activate the ECU to determine whether an engine operating mode should change from a mode in which the engine is not running to a mode in which the engine is running Thus, the embodiments described herein can lower fuel usage of the TRS, lower initial product cost and lower maintenance cost of the engine, and reduce excessive depletion of battery power while a TRU of the TRS is in a cycle sentry null mode.

In some embodiments, the TRS controller is configured to activate the ECU and acquire engine sensor data from the ECU after a calculated periodic system diagnostic (PSD) time period has lapsed. The TRS controller is configured to activate the ECU and acquire engine sensor data from the ECU via a TRS controller-to-ECU Communication Interface Bus. The acquired engine sensor data can then be used by the TRS controller to determine whether to change an engine operating mode from a mode in which the engine is not running to a mode in which the engine is running. The TRS controller is configured to determine whether to change the engine operating mode based on PSD inputs, for example, the type of engine in the TRS, previously acquired engine sensor data, a TRU configuration setting, a TRU operating mode, and a PSD Timer. Using the PSD inputs, the TRS controller can determine the next scheduled ECU activation time. When the TRS controller determines that the ECU activation time has been reached, the TRS controller can be configured to activate a keyswitch signal and a run signal on the ECU and begin execution of an engine start-up process.

In another embodiment, the TRS controller is configured to activate the ECU and acquire engine sensor data from the ECU after a fixed time period has lapsed.

Other aspects of the invention will become apparent by consideration of the detailed description and accompanying drawings.

BRIEF DESCRIPTION OF THE DRAWINGS

Referring now to the drawings in which like reference numbers represent corresponding parts throughout.

DETAILED DESCRIPTION

The embodiments described herein are directed to a transport refrigeration system (TRS). More particularly, the embodiments relate to methods and systems for periodic system diagnostic of a TRS.

References are made to the accompanying drawings that form a part hereof, and in which is shown by way of illustration of the embodiments in which the methods and systems described herein may be practiced. The term "refrigerated transport unit" generally refers to, for example, a conditioned trailer, container, railcars or other type of transport unit, etc. The term "transport refrigeration system" or "TRS" refers to a refrigeration system for controlling the refrigeration of an in conditioned space of the refrigerated transport unit. The term "TRS controller" refers to an electronic device that is configured to manage, command, direct and regulate the behavior of one or more TRS refrigeration components (e.g., an evaporator, a blower, a heat exchanger, etc.), a genset, etc.

It will be appreciated that the embodiments described herein may be used in any suitable temperature controlled apparatus such as a ship board container, an air cargo cabin, an over the road truck cabin, etc. The TRS may be a vapor-compressor type refrigeration system, or any other suitable refrigeration system that can use refrigerant, cold plate technology, etc. The genset, as described herein, refers to any type of genset that uses an electronically controlled engine.

Figure 1:
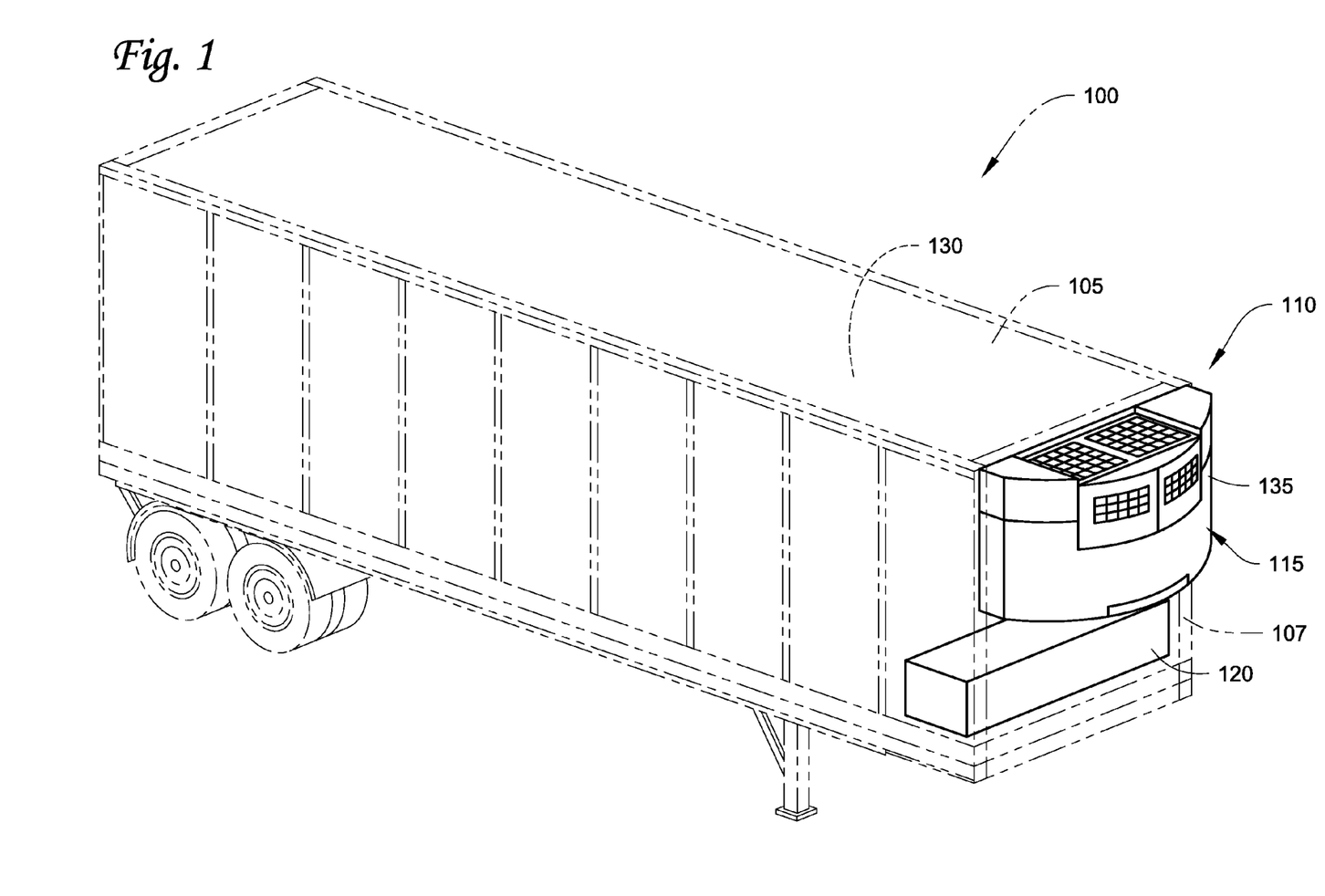
FIG. 1 illustrates a side perspective view of a refrigerated transport unit, according to one embodiment.

FIG. 1 illustrates a side view of a refrigerated transport unit 100 with a transport unit 105 and a TRS 110. The TRS 110 includes a TRU 115 connected to a genset 120. The transport unit 105 can be disposed on a ship, on a train, a truck, etc. The TRU 115 is positioned adjacent to a front side 107 of the transport unit 105 and is enclosed in a housing 135. The TRS 110 is configured to transfer heat between an internal space 130 and the outside environment. In some embodiments, the TRS 110 is a multi-zone system in which different zones or areas of the internal space 130 are controlled to meet different refrigeration requirements based on the cargo stored in the particular zone.

The TRU 115 is in communication with the space 130 and controls the temperature in the space 130. The TRU 115 includes a TRS Controller (e.g., TRS Controller 205 shown in FIG. 2) and a closed refrigerant circuit (not shown). The TRS Controller controls the refrigeration circuit to obtain various operating conditions (e.g., temperature, humidity, etc.) of the space 130 and is powered by the generator set 120. The TRS Controller can also be powered by a TRU battery and/or a backup battery. The closed refrigerant circuit regulates various operating conditions (e.g., temperature, humidity, etc.) of the space 130 based on instructions received from the TRS controller. The refrigeration circuit can include, for example, an Electronic Throttle Valve (ETV), a compressor coupled to a condenser and an evaporator that cools the space 130 and the perishable cargo.

The genset 120 includes an electronically controlled engine (e.g., engine 215 shown in FIG. 2), an electronic controller unit (ECU) (e.g. ECU 210 shown in FIG. 2), a fuel container (not shown) and a prime mover (not shown). In some embodiments, the electronically controlled engine is an electronically controlled internal combustion engine (e.g., diesel engine, etc.) that may generally have a cooling system (e.g., water or liquid coolant system), an oil lubrication system, and an electrical system (not shown). An air filtration system (not shown) filters air directed into a combustion chamber (not shown) of the engine. In some embodiments the engine is not specifically configured for the TRS 110, but can be a non-industrial electronically controlled engine such as, for example, an electronically controlled automotive engine. Also, in some embodiments, the electronically controlled engine is an electronically controlled Tier-4 Engine that is configured to comply with Environmental Protection Agency (EPA) Tier-4 emissions requirements. The fuel container is in fluid communication with the electronically controlled engine to deliver a supply of fuel to the electronically controlled engine.

Figure 2:
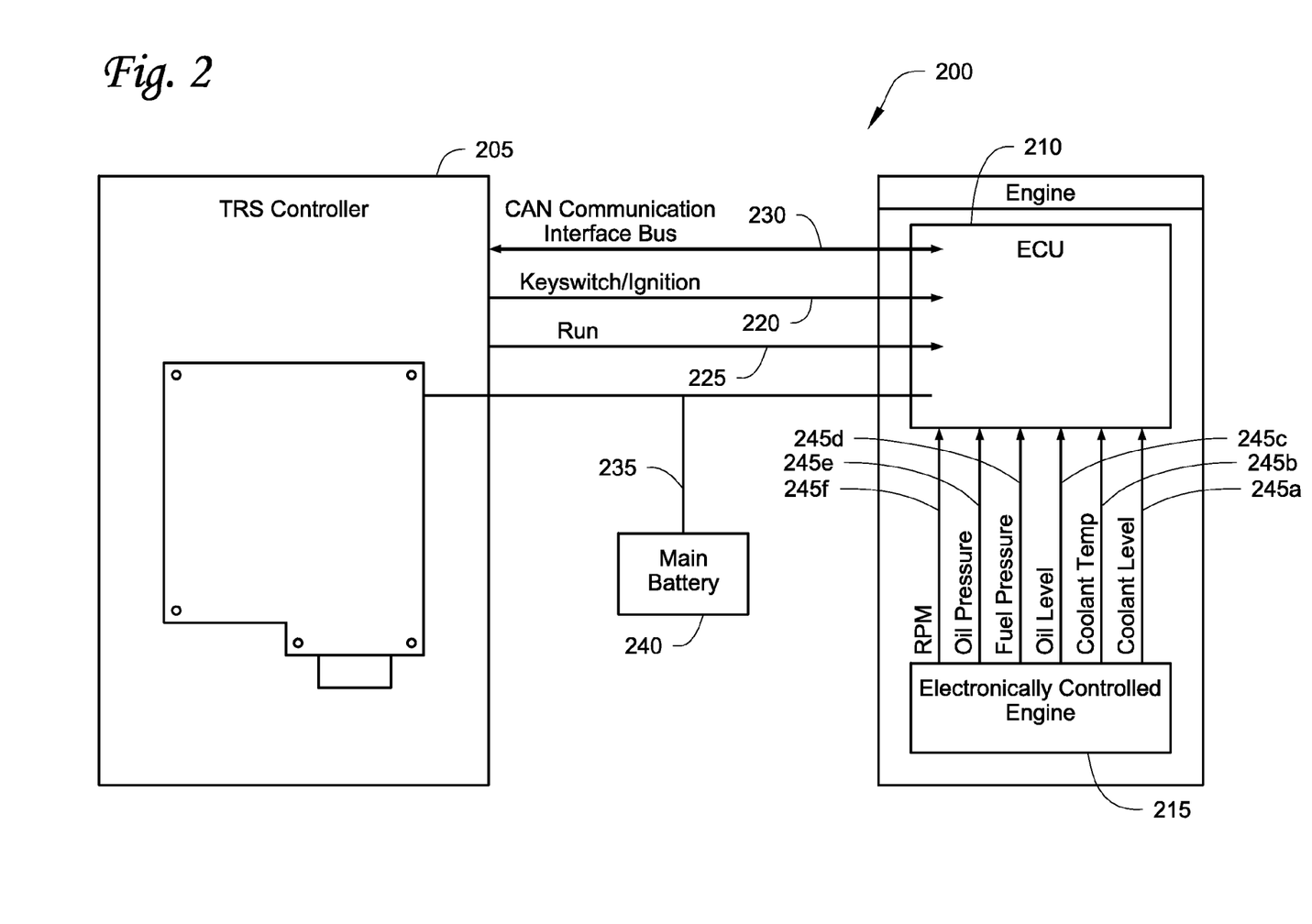
FIG. 2 illustrates a schematic of a TRS Controller to ECU interface within a TRS, according to one embodiment.

The electronically controlled engine is further controlled by the ECU. The ECU can be configured to regulate an amount of fuel delivered to the engine and can be configured to operate the engine at a single speed or multiple speeds. The ECU is generally configured to allow the engine to be maintained at a chosen speed regardless of the load seen by the engine. As discussed in more detail below, the ECU is connected to and communicates with the TRS Controller.

While the transport unit 105 in FIG. 1 is directed to a trailer type transport unit, it will be appreciated that the embodiments directed to a TRS Controller to ECU interface in the TRS 110 can also be used, for example, in a truck type transport unit, a container type transport unit, etc.

FIG. 2 illustrates a schematic of a TRS Controller to ECU interface 200 within a TRS (e.g., the TRS 110 in FIG. 1), according to one embodiment. The interface 200 includes a TRS Controller 205 connected to an ECU 210 that is part of an engine 215. Also, in some embodiments, the engine 215 is an electronically controlled Tier-4 Engine that is configured to comply with Environmental Protection Agency (EPA) Tier-4 emissions requirements.

The interface 200 includes a keyswitch connection 220 that is configured to send a keyswitch signal from the TRS Controller 205 to the ECU 210, a run signal connection 225 that is configured to send a run signal from the TRS Controller 205 to the ECU 210, and a Controller Area Network (CAN) communication interface bus 230 that is configured to provide two-way communication between the TRS Controller 205 and the ECU 210.

The interface 200 also includes a main battery connection 235 for providing power from a main battery 240 to the TRS Controller 205 and the ECU 210. In one embodiment, the main battery 240 is a ~12 volt battery.

In some embodiments, the keyswitch connection 220 and the run signal connection 225 are wired connections. Also, in some embodiments, the CAN communication interface bus 230 is a wireless connection in which digital data messages can be transmitted between the TRS Controller 205 and the ECU 210. In some embodiments, the CAN communication interface bus 230 is configured to transmit and receive data using a wireless communication protocol such as, for example, ZigBee, Bluetooth, or any other type of wireless communication protocol that allows for accurate transmission of data between the TRS Controller 205 and the ECU 210 during transport.

The keyswitch connection 220 is configured to enable the ECU 210 for Engine Sub-System operation, disable the ECU 210, and to facilitate TRS power management. In one embodiment, the keyswitch connection 220 can perform the above functions by invoking a high/active logic state and/or a low/inactive logic state. When in the high/active logic state, the keyswitch connection 220 is configured to enable communication between the TRS Controller 205 and the engine 215 via the ECU 210. When the keyswitch connection 220 transitions from the high/active logic state to the low/inactive logic state, the ECU 210 is configured to enter a power latch stage prior to completely shutting off. The ECU 210 is configured to command a pre-shutdown component calibration and is configured to write data to a permanent memory (not shown).

The run signal connection 225 is configured to, via the ECU 210, prepare the engine 215 for starting, instructing the engine 215 to stop, reinitializing an ECU 210 start routine, and managing power consumption of the TRS generally. In one embodiment, the run signal connection 225 can perform the above functions by invoking a high/active logic state and/or a low/inactive logic state. When in the high/active logic state, the run signal connection 225 is configured to prepare the engine 215, via the ECU 210, for starting. When the run signal connection 225 transitions from the high/active logic state to the low/inactive logic state and the engine 215 is running, the run signal connection 225 is configured to instruct the engine 215, via the ECU 210, to stop. This reduces power consumption of the main battery 240 while still allowing data communication between the ECU 210 and TRS Controller 205 via the CAN communication interface bus 230.

The CAN communication interface bus 230 is configured to facilitate communication between the TRS Controller 205 and the ECU 210. In particular, the CAN communication interface bus 230 is configured to transmit data messages from the TRS Controller 205 to the ECU 210 that include, for example, an engine crank command message, an engine target speed command message, an engine stop request message, etc. Accordingly, the TRS Controller 205 can instruct the engine 215, via the ECU 210, to stop via the run signal connection 225 or the CAN communication interface bus 230.

The engine 215 includes a plurality of engine data sensors 245 that provide information to the ECU 210. For example, the engine data sensors 245 can include, for example, a coolant level sensor 245a, a coolant temperature sensor 245b, an oil level sensor 245c, a fuel pressure sensor 245d, an oil pressure sensor 245e, an engine speed sensor 245f, etc.

The TRS Controller 205 is configured to set and control a TRU operating mode of the TRU (e.g., the TRU 115 in FIG. 1). The TRU operating modes can include, for example, a heating mode, a cooling mode, a defrost mode, etc.). The TRS Controller 205 is also configured to set and control TRU configuration settings based on the TRU operating mode. The TRS configuration settings can include, for example, a TRU Cycle-Sentry Null, or other start/stop TRU configuration settings to maintain the desired conditions within an interior space of a transport unit (e.g., the interior space 130 of the transport unit 105 in FIG. 1). Further, the TRS Controller is configured to set and control an engine operating mode of the electronically controlled engine 215, via the ECU 210. The engine operating modes can include modes in which the electronically controlled engine 215 is not running and modes in which the electronically controlled engine 215 is running. When the TRS Controller 205 sets the electronically controlled engine 215 to an engine operating mode in which the engine is not running, the ECU 210 can be in either a minimum electrical power consumption stage or a medium electrical power consumption stage.

For the purposes of this application, the ECU 210 is in a minimum electrical power consumption stage when both the keyswitch connection 220 and the run signal connection 225 are in a low/inactive logic state, and the main battery 240 is providing minimum power to the ECU 210 so that the ECU 210 can be activated when the keyswitch connection 220 is switched by the TRS Controller 205 into the high/active logic state. Also, the ECU 210 is in a medium power consumption stage when the keyswitch connection 220 is in the high/active logic state and the run signal connection 225 is in a low/inactive logic state.

By efficiently managing the PSD time period for the TRS Controller 205 to bring the ECU 210 out of a minimum electrical power consumption stage into a medium power consumption stage, the TRS controller can determine whether an engine operating mode should change from a mode in which the engine is not running to a mode in which the engine is running. This prevents the need to implement a duplicate set of engine data acquisition sensors on the TRS controller in order to shed current draw during, for example, TRU Cycle Sentry Null or other Start/Stop TRU modes. Thus, the embodiments described herein can lower fuel usage of the TRS, lower initial product cost and lower maintenance cost of the engine, and reduce excessive depletion of battery power while a TRU of the TRS is in, for example, a cycle sentry null mode. In some embodiments, the TRU Cycle Sentry Null mode is a fuel conserving mode in which the TRS is temporarily shut down.

Figure 3:
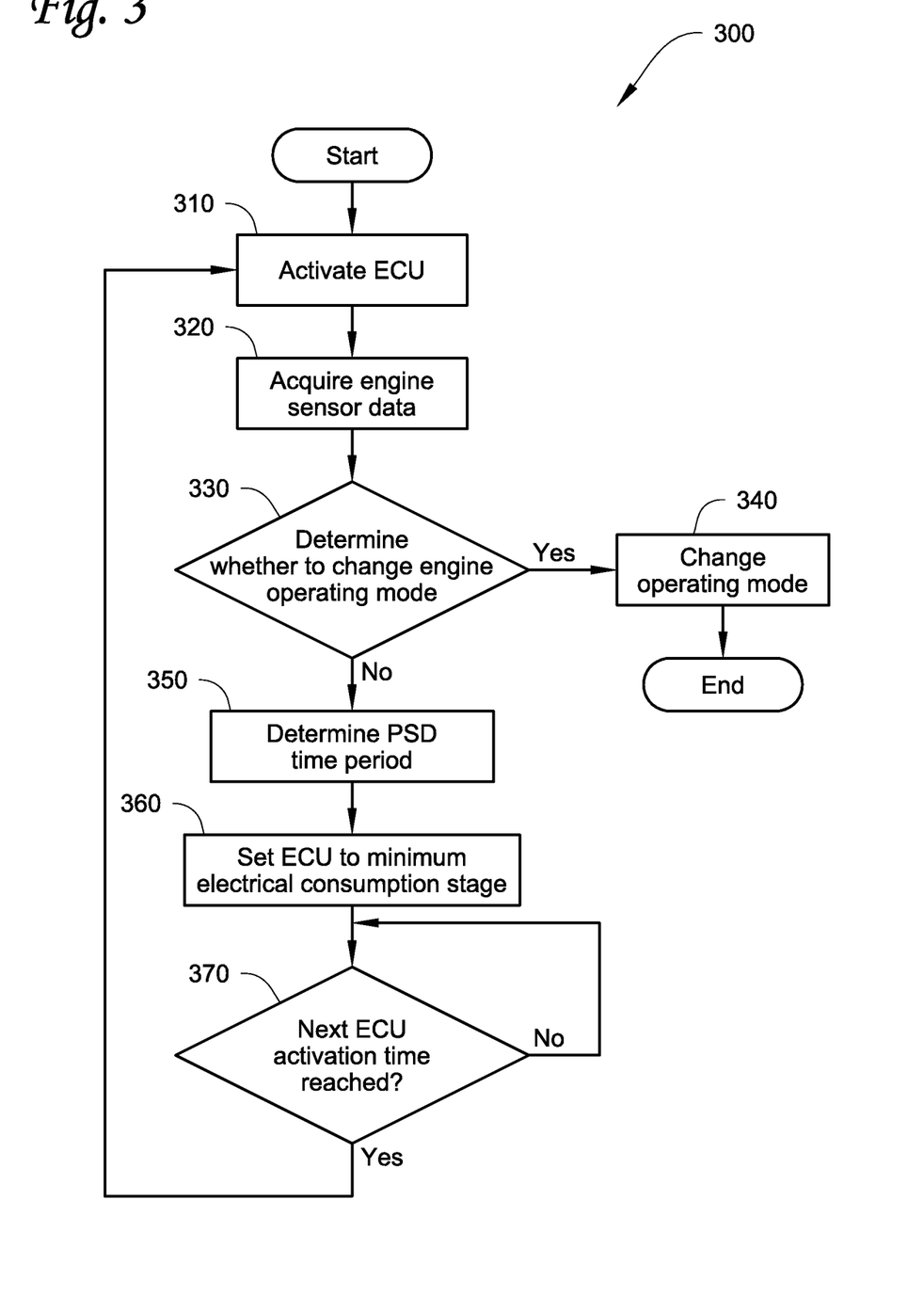
FIG. 3 illustrates a flowchart of a process for determining an efficient time to bring the ECU out of a minimum electrical power consumption stage into a medium power consumption stage in order to determine a next action of the TRS, according to one embodiment.

FIG. 3 illustrates a flowchart of a process 300 for determining an efficient time to bring the ECU 210 out of a minimum electrical power consumption stage into a medium power consumption stage in order to determine a next action of the TRS, according to one embodiment.

The process 300 begins with the electronically controlled engine 215 set to an engine operating mode in which the electrically controlled engine 215 is not running and the ECU 210 is in a minimum electrical power consumption stage. At 310, the TRS Controller 205 instructs the ECU 210, via the keyswitch connection 220, to operate in a medium electrical power consumption stage. The process 300 then proceeds to 320.

At 320, the TRS Controller 205 obtains engine sensor data from the ECU 210 via the CAN communication interface bus 230. The engine sensor data can be data obtained by the sensors 245 including, for example, a coolant level from the coolant level sensor 245a, a coolant temperature from the coolant temperature sensor 245b, an oil level from the oil level sensor 245c, a fuel pressure from the fuel pressure sensor 245d, an oil pressure from the oil pressure sensor 245e, an engine speed from the engine speed sensor 245f, etc.

By relaying the engine sensor data from the ECU 210 to the TRS Controller 205 via the CAN communication interface bus 230, it becomes unnecessary to implement a duplicate set of engine data acquisition sensors on the TRS Controller 205. Thus, the TRS Controller 205 can shed current draw from the main battery 240 to measure engine sensor data during engine operating modes in which the electronically controlled engine is not running. The process 300 then proceeds to 330.

At 330, the TRS Controller 205 determines whether the electronically controlled engine 215 should be set to an engine operating mode in which the electronically controlled engine 215 is running. The TRS Controller 205 can determine whether the electronically controlled engine 215 should be set to an engine operating mode in which the electronically controlled engine 215 is running based on a variety of factors such as, for example, whether the current temperature within the interior space transport unit (e.g. the interior space 130 of the transport unit 105 in FIG. 1) has moved above or below a desired temperature threshold and needs to be heated/cooled to meet the desired temperature setpoint, or to keep the engine warm during time periods when engine power to run the TRU is not required.

If the TRS Controller 205 determines that the electronically controlled engine 215 should be set to an engine operating mode in which the engine is running, the process 300 proceeds to 340. If the TRS Controller 205 determines that the electronically controlled engine 215 should be set to an engine operating mode in which the electronically controlled engine 215 is not running, the process 300 proceeds to 350.

At 340 the TRS Controller 205 sends a run signal to the ECU 210 via the run signal connection 225 that instructs the ECU 210 to run the electronically controlled engine 215. The process 300 is then finished until such time as the TRS Controller 205 sets the electronically controlled engine 215 to an engine operating mode in which the electronically controlled engine 215 is not running.

At 350 the TRS Controller 205 then determines an efficient PSD time period to wait before bringing the ECU 210 out of the minimum electrical power consumption stage into the medium power consumption stage in order to determine a next action of the TRS. In some embodiments, the TRS Controller 205 determines the PSD time period based on data such as, for example, real-time coolant temperature, real-time ambient temperature outside of the transport unit, and the condition of the radiator. The process 300 then proceeds to 360.

At 360, the TRS controller instructs the ECU 210, via the keyswitch connection 220, to operate in a minimum electrical power consumption stage for the PSD time period determined at 350.

At 370, the TRS Controller 205 determines whether the PSD time period has lapsed. If the PSD time period has not passed, the process 300 returns to 370. If the PSD time period has passed, the process 300 returns to 310 where the TRS Controller 205 instructs the ECU 210, via the keyswitch connection 220, to operate in a medium electrical power consumption stage.

Figure 4:
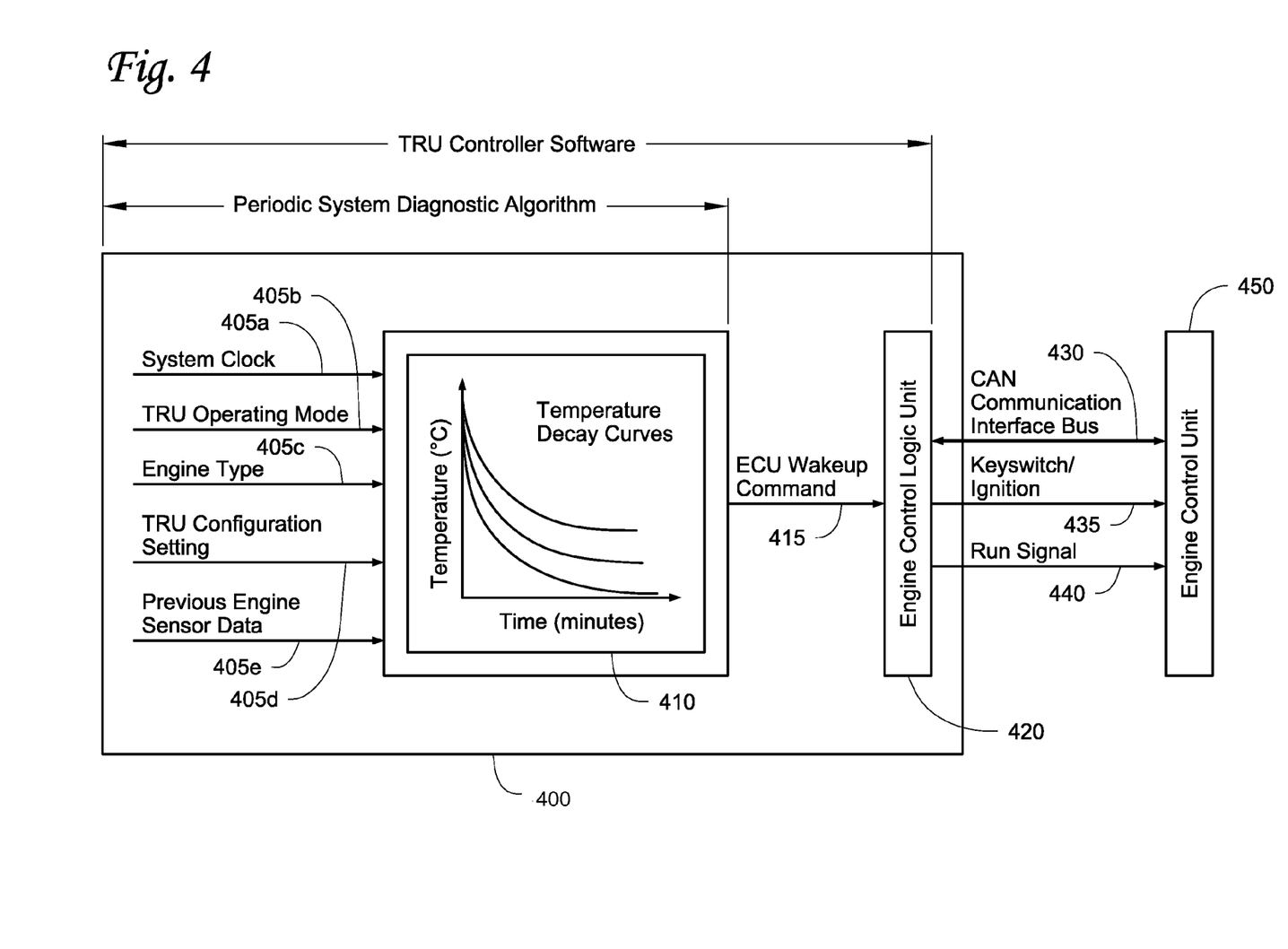
FIG. 4 illustrates a block diagram for determining an efficient PSD time period to wait before bringing an ECU out of a minimum electrical power consumption stage into a medium power consumption stage in order to determine a next action of the TRS, according to one embodiment.

FIG. 4 illustrates an embodiment of a block diagram for determining an efficient PSD time period to wait before bringing an ECU 450 out of a minimum electrical power consumption stage into a medium power consumption stage in order to determine a next action of the TRS, using a TRS Controller 400.

The TRS Controller 400 is connected to an ECU 450. The TRS Controller 400 includes an ECU operation determination unit 410 and an Engine Control Logic Unit 420. The ECU operation determination unit 410 receives PSD inputs 405 and can output an ECU wakeup command signal to the Engine Control Logic Unit 420 via an ECU wakeup command connection 415. The Engine Control Logic Unit 420 of the TRS Controller 400 is connected to the ECU 450 via a CAN communication interface bus 430, a keyswitch connection 435 and a run signal connection 440. It will be appreciated that the CAN communication interface bus 430, the keyswitch connection 435 and the run signal connection 440 operate similar to the CAN communication interface bus 230, the keyswitch connection 220 and the run signal connection 225 described above with respect to FIG. 2.

The ECU operation determination unit 410 obtains the PSD inputs 405 including, for example, a system clock input 405a, a TRU operating mode input 405b, an engine type input 405c, a TRU configuration input 405d, engine sensor data input 405e, etc. The system clock input 405a obtains real-time system clock information from a TRS system clock (not shown) within the TRS Controller 400. The TRU operating mode input 405b inputs the current TRU operating mode of the TRS set by the TRS Controller 400 (e.g., heating mode, cooling mode, defrost mode, etc.). The engine type input 405c inputs information as to the type of the electronically controlled engine (not shown) (e.g., size and condition of a radiator of the engine). The TRU configuration input 405d inputs information as to the configuration settings of the TRU (not shown) (e.g., Cycle-Sentry mode, Sleep mode, Run mode, etc.). The engine sensor data input 405e inputs engine sensor data previously obtained by the TRS Controller 400 from the ECU 450 via the CAN communication interface 430. The engine sensor data obtained by the TRS Controller 400 can be the engine sensor data obtained the ECU 450 is activated and/or previously obtained engine sensor data stored by the TRS Controller 400.

The PSD inputs 405 are used by the ECU operation determination unit 410 to determine a PSD time period to wait before bringing the ECU 450 out of the minimum electrical power consumption stage into the medium power consumption stage in order to determine a next action of the TRS. The ECU operation determination unit 410 is configured to determine, on the fly, the PSD time period based on the PSD inputs period by using a predictive algorithm.

In some embodiments, the PSD inputs 405 are matched to temperature decay curve data stored in the ECU operation determination unit 410 to determine an efficient PSD time period. Also, in some embodiments, the Engine Control Logic Unit 410 can use the PSD inputs 405 and the following equations to determine the efficient PSD time period:

$$Q = mc_p \delta T/\delta t = hA(\Delta T)$$

$$\Delta T = T_{\_initial} - T_{\_Amb}$$

$$\text{Theta} = (\text{Temp} - T_{\_amb})/(T_{\_initial} - T_{\_amb}) = \exp[(-hA/mc_p)t]$$

In the above equations, 'Q' represents lost heat, whereby the heat flows from a coolant to a radiator (conductive) and then from the radiator to surrounding air (convection). 'M' represents a mass of the object holding the heat and '$c_p$' represents an intrinsic value of the object to lose or gain heat. 'H' represents a heat transfer coefficient that is applied to a rate of transfer based on surrounding material (e.g., $W(m^{2K})$) 'A' represents a heat transfer surface area ($m^2$). '$\Delta T$' represents a temperature difference between a surface of the radiator and a cooling solution (e.g., coolant). 'Temp' represents a target engine coolant temperature where the engine is to be started so as to avoid lackadaisical engine starting performance. '$T_{\_amb}$' represents a temperature of air immediately surrounding the radiator. '$T_{\_initial}$' represents an engine coolant temperature at a time the engine shuts down due to a TRU box temperature target being met.

In some embodiments, a value for '$T_{\_initial}$' is acquired during a previous shutdown of the engine. Also, in some embodiments, a heat transfer equation is used to compute a time theta when the coolant temperature is expected to reach 'Temp'.

When the efficient PSD time period has lapsed, the ECU operation determination unit 410 is configured to send an ECU wakeup command signal to the Engine Control Logic Control Unit 420 via the ECU wakeup command connection 415. The Engine Control Logic Control Unit 420 then sends a keyswitch signal to the ECU 450 via the keyswitch connection 435 to bring the ECU 450 out of a minimum electrical power consumption stage into a medium power consumption stage without having to start the electronically controlled engine.

Aspects:

It is noted that any of aspects 1-8, 9-16, 17-23 and 24-28 can be combined.

Aspect 1. A method for periodic system diagnostic of a transport refrigeration system for a refrigerated transport unit, the transport refrigeration system including a transport refrigeration unit controlled by a transport refrigeration system controller and powered by an electrically controlled engine having an engine control unit, the method comprising:

the transport refrigeration system controller sending a medium electrical power consumption stage activation signal, via a keyswitch connection, to the electronic control unit when the electronically controlled engine is set to an engine operating mode in which the electronically controlled engine is not running, the medium electrical power consumption stage activation signal instructing the electronic control unit to activate and operate at a medium electrical power consumption stage;

the transport refrigeration system controller obtaining engine sensor data from the electronic control unit via a Controller Area Network (CAN) communication interface bus;

the transport refrigeration system controller determining a periodic system diagnostic time period based on the engine sensor data obtained from the electronic control unit.

Aspect 2. The method of aspect 1, further comprising:

activating the electronic control unit at the medium electrical power consumption stage.

Aspect 3. The method of aspects 1-2, further comprising:

determining a temperature of an interior space of the refrigerated transport unit;

the transport refrigeration system controller determining that the electronically controlled engine is to be set to an engine operating mode in which the electronically controlled engine is running when the temperature of the interior space above or below a desired temperature threshold.

Aspect 4. The method of aspects 1-3, further comprising:

the transport refrigeration system controller sending a run signal to the electronically controlled engine when the transport refrigeration system controller determines that the electronically controlled engine is to be set to an engine operating mode in which the electronically controlled engine is running.

Aspect 5. The method of aspects 1-4, wherein the transport refrigeration system controller determines the periodic system diagnostic time period based on one or more of the engine sensor data, a real-time ambient temperature outside of the refrigerated transport unit, and a condition of a radiator of the transport refrigeration system.

Aspect 6. The method of aspects 1-5, further comprising:

the transport refrigeration system controller sending a minimum electrical power consumption stage activation signal, via the keyswitch connection, to the electronic control unit, the minimum electrical power consumption stage activation signal instructing the electronic control unit to activate and operate at a minimum electrical power consumption stage.

Aspect 7. The method of aspect 6, wherein the minimum electrical power consumption stage of the electronic control unit occurs when the keyswitch connection and the run signal connection are at an inactive logic state, and a main battery of the transport refrigeration system provides a minimum power required to activate the electronic control unit.

Aspect 8. The method of aspects 1-7, wherein the medium electrical power consumption stage occurs when the keyswitch connection is at an active logic state and the run signal connection is at an inactive logic state.

Aspect 9. The method of aspects 1-8, the transport refrigeration system controller determining the periodic system diagnostic time period based on one or more of a system clock data, a transport refrigeration unit operating mode data, an engine type data, a transport refrigeration unit configuration data and an engine sensor data.

Aspect 10. The method of aspect 9, wherein the transport refrigeration system controller determining the periodic system diagnostic time period includes:

matching one or more of the system clock data, the transport refrigeration unit operating mode data, the engine type data, the transport refrigeration unit configuration data and the engine sensor data to temperature decay curve data.

Aspect 11. A transport refrigeration system for a refrigerated transport unit, the transport refrigeration system comprising:

an electronically controlled engine including an electronic control unit;

a transport refrigeration unit attached to the refrigerated transport unit, the transport refrigeration unit including a transport refrigeration system controller;

a Controller Area Network (CAN) communication interface bus configured to connect the transport refrigeration system controller to the electronic control unit, wherein the transport refrigeration system is programmed to receive engine sensor data from the electronic control unit via the CAN communication interface bus; and a keyswitch connection configured to connect the transport refrigeration system controller to the electronic control unit;

wherein the transport refrigeration system controller is programmed to determine a periodic system diagnostic time period based on the engine sensor data obtained from the electronic control unit.

Aspect 12. The transport refrigeration system of aspect 11, further comprising:

a run signal connection configured to connect the transport refrigeration system controller to the electronic control unit, wherein the transport refrigeration system controller is programmed to send a run signal to the electronically controlled engine when the transport refrigeration system controller determines that the electronically controlled engine is to be set to an engine operating mode in which the electronically controlled engine is running.

Aspect 13. The transport refrigeration system of aspects 11-12, wherein the transport refrigeration system controller is programmed to determine the periodic system diagnostic time period based on one or more of the engine sensor data, a real-time ambient temperature outside of the refrigerated transport unit, and a condition of a radiator of the transport refrigeration system.

Aspect 14. The transport refrigeration system of aspects 11-13, wherein the transport refrigeration system controller is programmed to send a minimum electrical power consumption stage activation signal, via the keyswitch connection, to the electronic control unit, and wherein the minimum electrical power consumption stage activation signal is configured to instruct the electronic control unit to activate and operate at a minimum electrical power consumption stage.

Aspect 15. The transport refrigeration system of aspect 14, further comprising:

a main battery connected to the transport refrigeration system controller and the electronic control unit, wherein the minimum electrical power consumption stage of the electronic control unit is defined by the keyswitch connection and the run signal connection being set to an inactive logic state, and the main battery of the transport refrigeration system is configured to provide a minimum power required to activate the electronic control unit.

Aspect 16. The transport refrigeration system of aspects 11-15, wherein the transport refrigeration system controller is programmed to send a medium electrical power consumption stage activation signal to the electronic control unit via the keyswitch connection when the electronically controlled engine is set to an engine operating mode in which the electronically controlled engine is not running, the medium electrical power consumption stage activation signal configured to instruct the electronic control unit to activate and operate at a medium electrical power consumption stage.

Aspect 17. The transport refrigeration system of aspect 16, wherein the medium electrical power consumption stage is defined by the keyswitch connection being set to an active logic state and the run signal connection being set to an inactive logic state.

Aspect 18. The transport refrigeration system of aspects 11-17, wherein the transport refrigeration system controller is programmed to determine the periodic system diagnostic time period based on one or more of a system clock data, a transport refrigeration unit operating mode data, an engine type data, a transport refrigeration unit configuration data and an engine sensor data.

Aspect 19. The transport refrigeration system of aspect 18, wherein the transport refrigeration system controller is programmed to determine the periodic system diagnostic time period by matching one or more of the system clock data, the transport refrigeration unit operating mode data, the engine type data, the transport refrigeration unit configuration data and the engine sensor data to temperature decay curve data.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What is claimed is:

1. A method for periodic system diagnostic of a transport refrigeration system for a refrigerated transport unit, the transport refrigeration system including a transport refrigeration unit controlled by a transport refrigeration system controller and powered by an electrically controlled engine having an engine control unit, the method comprising:
   the transport refrigeration system controller sending a medium electrical power consumption stage activation signal, via a keyswitch connection, to an electronic control unit when the electronically controlled engine is set to an engine operating mode in which the electronically controlled engine is not running, the medium electrical power consumption stage activation signal instructing the electronic control unit to activate and operate at a medium electrical power consumption stage;
   the transport refrigeration system controller obtaining engine sensor data from the electronic control unit via a Controller Area Network (CAN) communication interface bus;
   the transport refrigeration system controller determining a periodic system diagnostic time period based on the engine sensor data obtained from the electronic control unit.

2. The method of claim 1, further comprising: activating the electronic control unit at the medium electrical power consumption stage.

3. The method of claim 1, further comprising:
   determining a temperature of an interior space of the refrigerated transport unit;
   the transport refrigeration system controller determining that the electronically controlled engine is to be set to an engine operating mode in which the electronically controlled engine is running when the temperature of the interior space above or below a desired temperature threshold.

4. The method of claim 1, further comprising:
   the transport refrigeration system controller sending a run signal to the electronically controlled engine when the transport refrigeration system controller determines that the electronically controlled engine is to be set to an engine operating mode in which the electronically controlled engine is running.

5. The method of claim 1, wherein the transport refrigeration system controller determines the periodic system diagnostic time period based on one or more of the engine sensor data, a real-time ambient temperature outside of the refrigerated transport unit, and a condition of a radiator of the transport refrigeration system.

6. The method of claim 1, further comprising: the transport refrigeration system controller sending a minimum electrical power consumption stage activation signal, via the keyswitch connection, to the electronic control unit, the minimum electrical power consumption stage activation signal instructing the electronic control unit to activate and operate at a minimum electrical power consumption stage.

7. The method of claim 6, wherein the minimum electrical power consumption stage of the electronic control unit occurs when the keyswitch connection and the run signal connection are at an inactive logic state, and a main battery of the transport refrigeration system provides a minimum power required to activate the electronic control unit.

8. The method of claim 1, wherein the medium electrical power consumption stage occurs when the keyswitch connection is at an active logic state and the run signal connection is at an inactive logic state.

9. The method of claim 1, the transport refrigeration system controller determining the periodic system diagnostic time period based on one or more of a system clock data, a transport refrigeration unit operating mode data, an engine type data, a transport refrigeration unit configuration data and an engine sensor data.

10. The method of claim 9, wherein the transport refrigeration system controller determining the periodic system diagnostic time period includes: matching one or more of the system clock data, the transport refrigeration unit operating mode data, the engine type data, the transport refrigeration unit configuration data and the engine sensor data to temperature decay curve data.

11. A transport refrigeration system for a refrigerated transport unit, the transport refrigeration system comprising:
    an electronically controlled engine including an electronic control unit;
    a transport refrigeration unit attached to the refrigerated transport unit, the transport refrigeration unit including a transport refrigeration system controller;
    a Controller Area Network (CAN) communication interface bus configured to connect the transport refrigeration system controller to the electronic control unit, wherein the transport refrigeration system is programmed to receive engine sensor data from the electronic control unit via the CAN communication interface bus; and
    a keyswitch connection configured to connect the transport refrigeration system controller to the electronic control unit;
    wherein the transport refrigeration system controller is programmed to determine a periodic system diagnostic time period based on the engine sensor data obtained from the electronic control unit.

12. The transport refrigeration system of claim 11, further comprising:
    a run signal connection configured to connect the transport refrigeration system controller to the electronic control unit,
    wherein the transport refrigeration system controller is programmed to send a run signal to the electronically controlled engine when the transport refrigeration system controller determines that the electronically controlled engine is to be set to an engine operating mode in which the electronically controlled engine is running.

13. The transport refrigeration system of claim 11, wherein the transport refrigeration system controller is programmed to determine the periodic system diagnostic time period based on one or more of the engine sensor data, a real-time ambient temperature outside of the refrigerated transport unit, and a condition of a radiator of the transport refrigeration system.

14. The transport refrigeration system of claim 11, wherein the transport refrigeration system controller is programmed to send a minimum electrical power consumption stage activation signal, via the keyswitch connection, to the electronic control unit, and
    wherein the minimum electrical power consumption stage activation signal is configured to instruct the electronic control unit to activate and operate at a minimum electrical power consumption stage.

15. The transport refrigeration system of claim 14, further comprising:

a main battery connected to the transport refrigeration system controller and the electronic control unit, wherein the minimum electrical power consumption stage of the electronic control unit is defined by the keyswitch connection and the run signal connection being set to an inactive logic state, and the main battery of the transport refrigeration system is configured to provide a minimum power required to activate the electronic control unit.

16. The transport refrigeration system of claim 11, wherein the transport refrigeration system controller is programmed to send a medium electrical power consumption stage activation signal to the electronic control unit via the keyswitch connection when the electronically controlled engine is set to an engine operating mode in which the electronically controlled engine is not running, the medium electrical power consumption stage activation signal configured to instruct the electronic control unit to activate and operate at a medium electrical power consumption stage.

17. The transport refrigeration system of claim 16, wherein the medium electrical power consumption stage is defined by the keyswitch connection being set to an active logic state and the run signal connection being set to an inactive logic state.

18. The transport refrigeration system of claim 11, wherein the transport refrigeration system controller is programmed to determine the periodic system diagnostic time period based on one or more of a system clock data, a transport refrigeration unit operating mode data, an engine type data, a transport refrigeration unit configuration data and an engine sensor data.

19. The transport refrigeration system of claim 18, wherein the transport refrigeration system controller is programmed to determine the periodic system diagnostic time period by matching one or more of the system clock data, the transport refrigeration unit operating mode data, the engine type data, the transport refrigeration unit configuration data and the engine sensor data to temperature decay curve data.

* * * * *